United States Patent
Ollivier et al.

(10) Patent No.: US 10,343,348 B2
(45) Date of Patent: Jul. 9, 2019

(54) SYSTEM AND METHOD FOR POSITIONING AT LEAST ONE SPACER IN A LONGITUDINAL PIPE

(71) Applicant: AEROLIA, Toulouse (FR)

(72) Inventors: Gérard Ollivier, Orvault (FR); Olivier Gueno, Saint Malo de Guersac (FR); Laurent Harel, Montoir de Bretagne (FR)

(73) Assignee: AEROLIA, Toulouse (FR)

( * ) Notice: Subject to any disclaimer, the term of this patent is extended or adjusted under 35 U.S.C. 154(b) by 587 days.

(21) Appl. No.: 14/864,664

(22) Filed: Sep. 24, 2015

(65) Prior Publication Data

US 2016/0089835 A1 Mar. 31, 2016

(30) Foreign Application Priority Data

Sep. 26, 2014 (FR) .................................. 14 59107

(51) Int. Cl.
| | |
|---|---|
| B23P 21/00 | (2006.01) |
| B29C 65/00 | (2006.01) |
| F16L 9/18 | (2006.01) |
| B29C 65/02 | (2006.01) |
| B21D 9/04 | (2006.01) |
| B29K 27/18 | (2006.01) |
| B29L 23/00 | (2006.01) |
| B29L 31/24 | (2006.01) |

(Continued)

(52) U.S. Cl.
CPC ............ *B29C 66/816* (2013.01); *B29C 65/02* (2013.01); *B29C 66/5221* (2013.01); *F16L 9/18* (2013.01); *B21D 9/04* (2013.01); *B29K 2027/18* (2013.01); *B29L 2023/22* (2013.01); *B29L 2031/24* (2013.01); *F16L 7/00* (2013.01); *F16L 43/001* (2013.01)

(58) Field of Classification Search
CPC ......... B23P 11/00; B23P 11/022; B23P 19/00; B23P 19/022
See application file for complete search history.

(56) References Cited

U.S. PATENT DOCUMENTS

| | | | | |
|---|---|---|---|---|
| 3,900,938 A | * | 8/1975 | Blomgren, Sr. | ........ B23P 19/04 29/240 |
| 4,295,257 A | * | 10/1981 | Strohs | ..................... B23P 19/04 269/43 |

(Continued)

FOREIGN PATENT DOCUMENTS

| | | |
|---|---|---|
| EP | 2009338 A1 | 12/2008 |
| EP | 2425906 A1 | 3/2012 |

(Continued)

*Primary Examiner* — Lee D Wilson
(74) *Attorney, Agent, or Firm* — Klein, O'Neill & Singh, LLP

(57) ABSTRACT

The invention relates to a system for positioning at least one spacer in a longitudinal pipe having an outer duct and an inner duct mounted in said outer duct, the system including a bracing module configured to maintain a pipe longitudinally along an axis while maintaining positioning clearance between the inner duct and the outer duct, and an insertion module having a pusher member, guided longitudinally along said axis, that is configured to move at least one spacer in the positioning clearance of the longitudinal pipe.

18 Claims, 4 Drawing Sheets

(51) Int. Cl.
*F16L 7/00* (2006.01)
*F16L 43/00* (2006.01)

(56) References Cited

U.S. PATENT DOCUMENTS

| | | | | |
|---|---|---|---|---|
| 4,723,348 | A * | 2/1988 | Jaminet | B23P 19/06 |
| | | | | 29/240 |
| 5,497,809 | A | 3/1996 | Wolf | |
| 5,673,843 | A * | 10/1997 | Gainey | B23K 37/0533 |
| | | | | 228/44.5 |
| 6,367,788 | B1 * | 4/2002 | Babchuk | B23K 37/0443 |
| | | | | 269/45 |
| 7,837,084 | B2 * | 11/2010 | Simmons | B23K 37/0443 |
| | | | | 219/159 |
| 8,118,293 | B1 * | 2/2012 | Barger | B23Q 7/05 |
| | | | | 144/287 |
| 8,984,730 | B2 * | 3/2015 | Holmes | B25B 11/00 |
| | | | | 29/281.4 |
| 9,815,151 | B2 * | 11/2017 | Simmons | B23K 37/0538 |

FOREIGN PATENT DOCUMENTS

| | | |
|---|---|---|
| JP | 2004278556 A | 10/2004 |
| JP | 2009241145 A | 10/2009 |

* cited by examiner

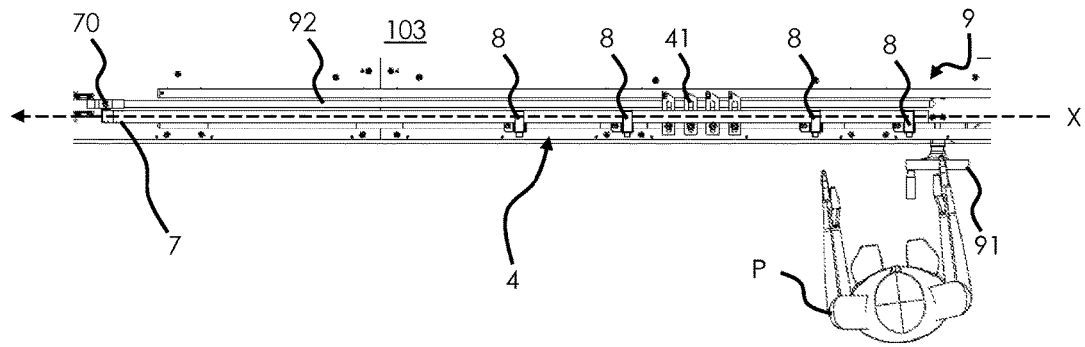
FIGURE 7
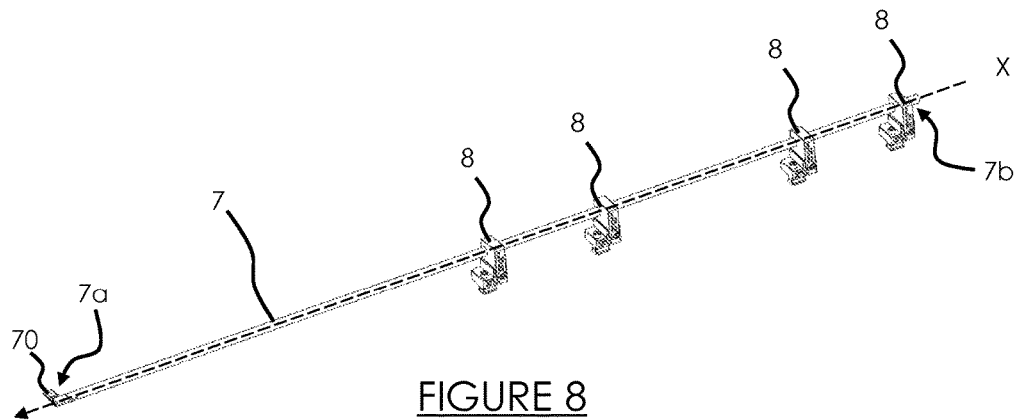
FIGURE 8
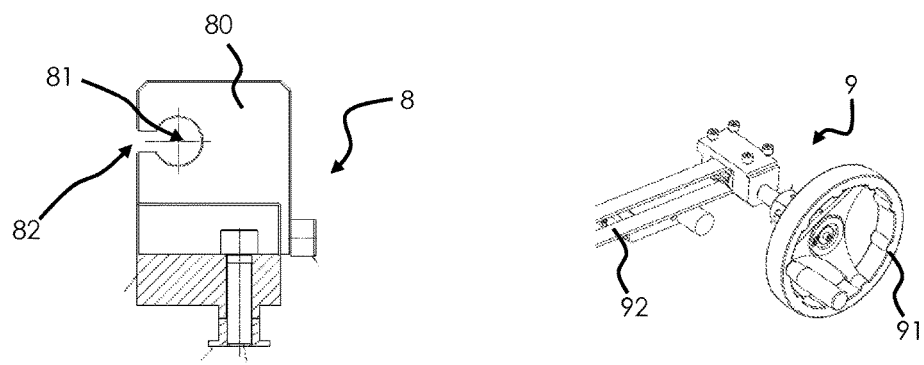
FIGURE 9
FIGURE 10

SYSTEM AND METHOD FOR POSITIONING AT LEAST ONE SPACER IN A LONGITUDINAL PIPE

GENERAL TECHNICAL FIELD AND PRIOR ART

The present invention relates to the field of aeronautics, and more particularly, the manufacture of a so-called "lined" pipe for the flow of fuel.

In a known manner, a lined fuel pipe includes a first duct, called the outer duct, and a second duct, called the inner duct, which mounted in the first outer duct. The inner duct makes it possible to conduct a flow of fuel while the outer duct forms a protective enclosure that makes it possible, on the one hand, to protect the inner duct in case of impact, and on the other hand, to collect fuel in the outer duct in the case that the inner duct leaks. This type of pipe also contributes to confining fuel vapors. Such a pipe is for example known from patent application U.S. Pat. No. 5,497,809.

The manufacture of such a fuel pipe is complex, given that it is necessary for the inner duct be positioned centrally in the outer duct. Furthermore, it is necessary to prevent the ducts from coming into contact during the manufacturing to create weak zones or obstruction zones upon passage of the fuel. Significant difficulties arise in the manufacture of a curved pipe.

Traditionally, to obtain a curved pipe, a sintering step is carried out for a longitudinal pipe in which a spacer is inserted between the inner face of the outer duct and the outer face of the inner duct. Thus, the spacer acts as an interface between the two pipes during the sintering and makes it possible to avoid any contact between said ducts.

In practice, to position the spacer between the two ducts, the operator manually manipulates a pin gauge in order to push the spacer from the opening of the pipe into the desired longitudinal zone of the pipe.

Such positioning of the spacer has many drawbacks. First, the positioning of the spacer is approximate, which can create drawbacks during the sintering step, the ducts then being able to come in contact with one another. Next, the pin gauge itself may come into contact with said ducts during the positioning of the spacer. Lastly, such a method can only be implemented for short pipes, i.e., shorter than 2 m. Due to the difficulty of inserting a spacer in a pipe, the number of sintered portions in a pipe is limited, in particular less than 1.5 sintered portions per meter of height.

The invention therefore aims to resolve these drawbacks by proposing a system and method for quickly and reliably positioning a spacer in a longitudinal pipe independently of its length.

BRIEF DESCRIPTION OF THE INVENTION

To that end, the invention relates to a system for positioning at least one spacer in a longitudinal pipe having an outer duct and an inner duct mounted in said outer duct, the system including a bracing module configured to maintain a pipe longitudinally along an axis while maintaining positioning clearance between the inner duct and the outer duct, and an insertion module having a pusher member, guided longitudinally along said axis, that is configured to move at least one spacer in the positioning clearance of the longitudinal pipe.

Owing to the system according to the invention, a spacer can be positioned precisely and reproducibly in a pipe, independently of its length. Furthermore, such a positioning system avoids any damage to the ducts of the pipe, the pipe thus not having any weak zones during its sintering.

Preferably, the outer duct having a front and rear end, the positioning module includes a front bracing member and a rear bracing member that are suitable for cooperating with the front end and the rear end of the outer duct, respectively. Thus, the position of the pipe is braced precisely over its entire length.

Advantageously, the rear bracing member includes a spacing part in order to maintain the positioning clearance between the inner duct and the outer duct. Thus, the position of the ducts of the pipe is defined precisely to avoid any damage.

According to one preferred aspect, said pusher member has an annular section able to be inserted into the positioning clearance of the longitudinal pipe so as to avoid any damage to the ducts.

Preferably, the insertion module includes a plurality of guide members distributed longitudinally to guide the pusher member and thus to ensure that the latter does not damage the pipes.

Also preferably, the insertion module includes means for driving the pusher member in order to allow regular and precise insertion.

Preferably, the insertion module includes stop means configured to limit the movement of the pusher member. Preferably, the stop means are positioned relative to the bracing member in which the front end of the outer duct is positioned.

The invention also relates to a method for positioning at least one spacer in a longitudinal pipe having an outer duct and an inner duct mounted in said outer duct, the method including:
 a step for bracing the pipe along an axis while retaining a positioning clearance between the inner duct and the outer duct, and
 a step for longitudinal insertion along the axis of the spacer in the positioning clearance of the longitudinal pipe.

Thus, a spacer can be positioned precisely and reproducibly in a pipe, independently of its length. Furthermore, such a positioning method avoids any damage to the ducts of the pipe, the pipe thus not having any weak zones during its sintering.

Preferably, the method includes a step for assembling the spacer on part of the inner duct extending protruding from the outer duct. Such a step is easy for an operator to carry out and makes it possible to align the spacer with the positioning clearance of the pipe.

Also preferably, the method includes a step for placing a stop member to limit the insertion travel and thus to position the spacer in the desired longitudinal position in the pipe.

The invention also relates to a method for sintering a longitudinal pipe having an outer duct and an inner duct mounted in said outer duct, the method including a positioning process, as previously described, for at least one spacer in the longitudinal pipe in a determined longitudinal position and a step for sintering said longitudinal pipe at said determined longitudinal position.

The positioning of the spacer being done reproducibly and in a controlled manner, the sintering step can be carried out without risks in order to obtain curved pipes without any weak zones.

DESCRIPTION OF THE FIGURES

The invention will be better understood upon reading the following description, provided solely as an example, and in reference to the appended drawings, in which:

FIG. 7 is a top view of the insertion module of FIG. 1;

FIG. 8 is a perspective view of the pusher member of the insertion module of FIG. 7;

FIG. 9 is a perspective view of a guide member of the insertion module of FIG. 7;

FIG. 10 is a perspective view of a driving wheel of the insertion module of FIG. 7;

It must be noted that the figures describe the invention in detail in order to implement the invention, said figures may of course be used to better define the invention if applicable.

DETAILED DESCRIPTION OF THE INVENTION

Below, a system will be described for positioning at least one spacer in a fuel pipe for an aircraft in order to sinter said pipe without risk of damage.

Figure 1:
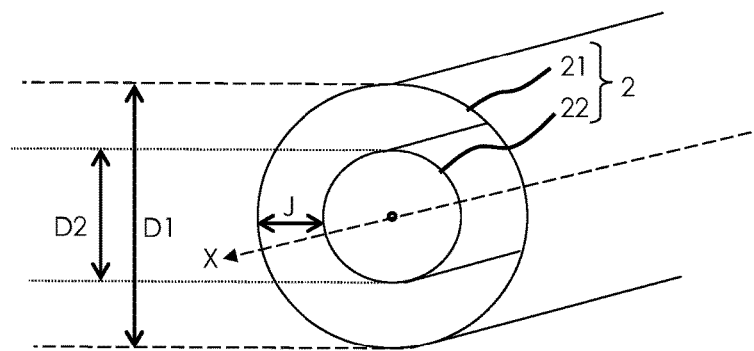
FIG. 1 is a cross-sectional view of the pipe.

As illustrated in FIG. 1, a fuel pipe 2 extends longitudinally along an axis X and comprises an outer longitudinal duct 21 and an inner longitudinal duct 22 mounted in said outer longitudinal duct 21. Under usage conditions, the ducts 21, 22 extend coaxially and are separated from one another by a functional clearance J. Preferably, each duct 21, 22 has a circular section. As an example, the outer duct 21 has a thickness of approximately 0.70 mm and an inner diameter D1 of approximately 24 mm, while the outer duct 22 has a thickness of approximately 0.70 mm and an outer diameter D2 of approximately 19 mm so as to define a functional clearance J smaller than 5 mm.

As will be described below, the outer longitudinal duct 21 is shorter than the inner longitudinal duct 22 so that the latter extends protruding from each end of the outer longitudinal duct 21.

Figure 2:
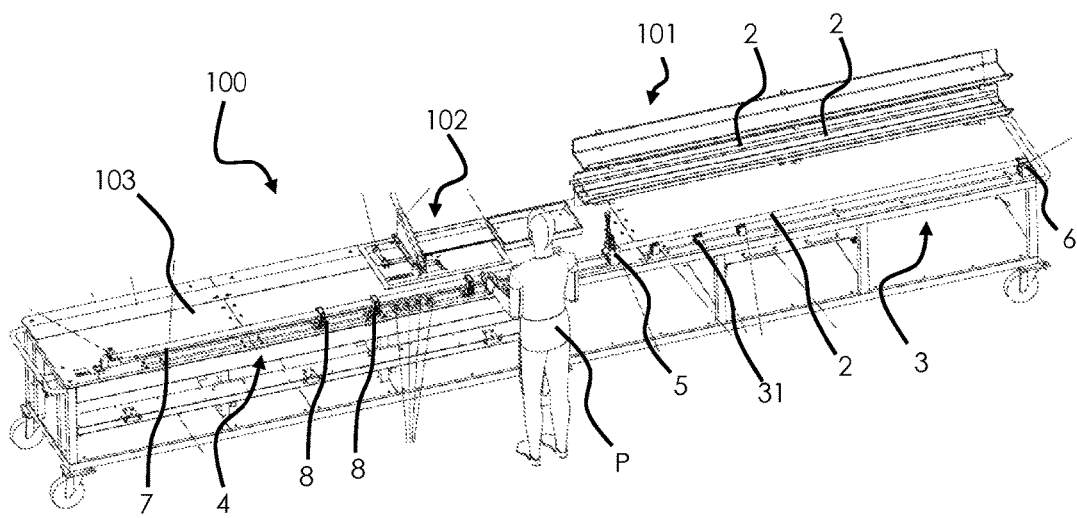
FIG. 2 is a diagrammatic perspective illustration of a positioning system according to the invention including a bracing module and an insertion module.

In reference to FIG. 2, an embodiment is shown of a positioning system 100 according to the invention that comprises several functional modules that can be used by an operator P. In particular, the positioning system 100 comprises a storage module 101 for receiving a plurality of longitudinal pipes 2, a cutting module 102 for cutting a spacer to the desired length, a bracing module 3 for a pipe 2 during positioning of a spacer and an insertion module 4 configured to move the spacer in the pipe 2 in the bracing position. In this example, the modules are mounted on a support table 103 provided with casters to facilitate its movement. The position of the bracing module 3 is perfectly defined relative to the insertion module 4 on the support table 103 so as to allow precise positioning of the spacer, as will be described below. In particular, the bracing module 3 and the insertion module 4 are axially aligned and separated by a predetermined axial distance.

Figure 3:
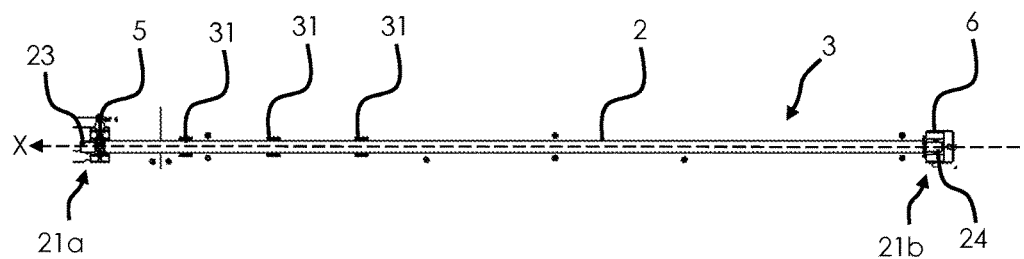
FIG. 3 is a top view of the bracing module of FIG. 2.

In reference to FIG. 3, the bracing module 3 extends longitudinally along the axis X from back to front and includes a first bracing member 5, also referred to as front bracing member 5, and a second bracing member 6, also referred to as rear bracing member 6, in order to keep the pipe 2 longitudinally aligned along the axis X. Hereinafter, the terms front and rear are defined relative to the axis X, which is oriented from back to front.

Figure 4:
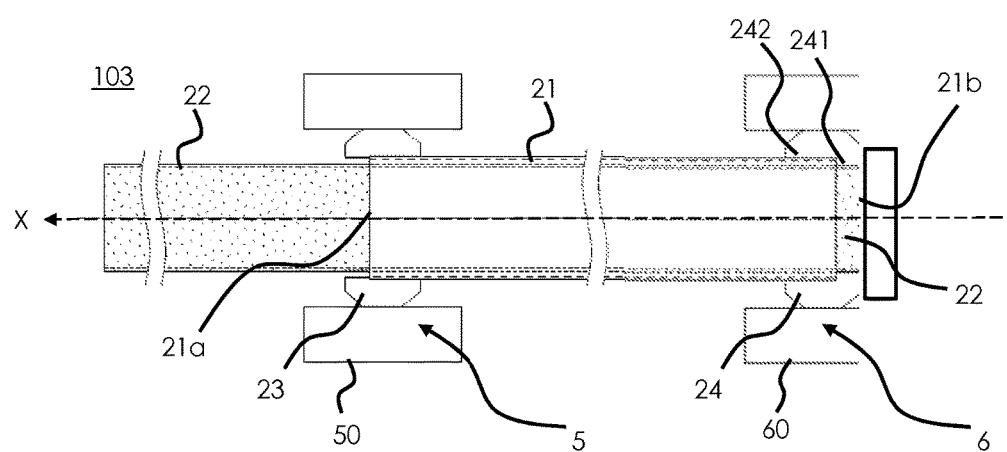
FIG. 4 is a partial diagrammatic view of the bracing module.

As illustrated in FIG. 4, the outer longitudinal duct 21 includes a front end 21a and a rear end 21b from which the inner longitudinal duct 22 protrudes. The front bracing member 5 and the rear bracing member 6 are respectively positioned at the front end 21a and the rear end 21b of the outer longitudinal duct 21 in order to block the position of the outer pipe 21. Preferably, in order to maintain the inner duct 22 coaxially in the outer duct 21, the rear end 21b of the outer longitudinal duct 21 is equipped with a rear spacing part 24 so as to guarantee a positioning clearance J between the outer longitudinal duct 21 and the inner longitudinal duct 22. The rear spacing part 24 is positioned at the rear end 21b of the outer duct 21 from which the inner duct 22 protrudes.

The bracing members 5, 6 are mounted in the support table 103, the front bracing member 5 being stationary in order to be positioned precisely relative to the insertion module 4 while the rear bracing member 6 is positioned to adapt to the length of the pipe 2. The front bracing member 5 includes a stop part 23 adapted to block the translation of the outer duct 21 forward as illustrated in FIG. 4. The front bracing member 5 includes a structural body 50 including a cavity to receive and brace the stop part 23.

As illustrated in FIG. 4, the stop part 23 is mounted at the front end 21a of the outer duct 21 and cooperates with the outer surface of the outer duct 21 without interfering with the inner duct 22 such that the functional clearance J between the ducts 21, 22 remains clear.

Figures 5, 6:
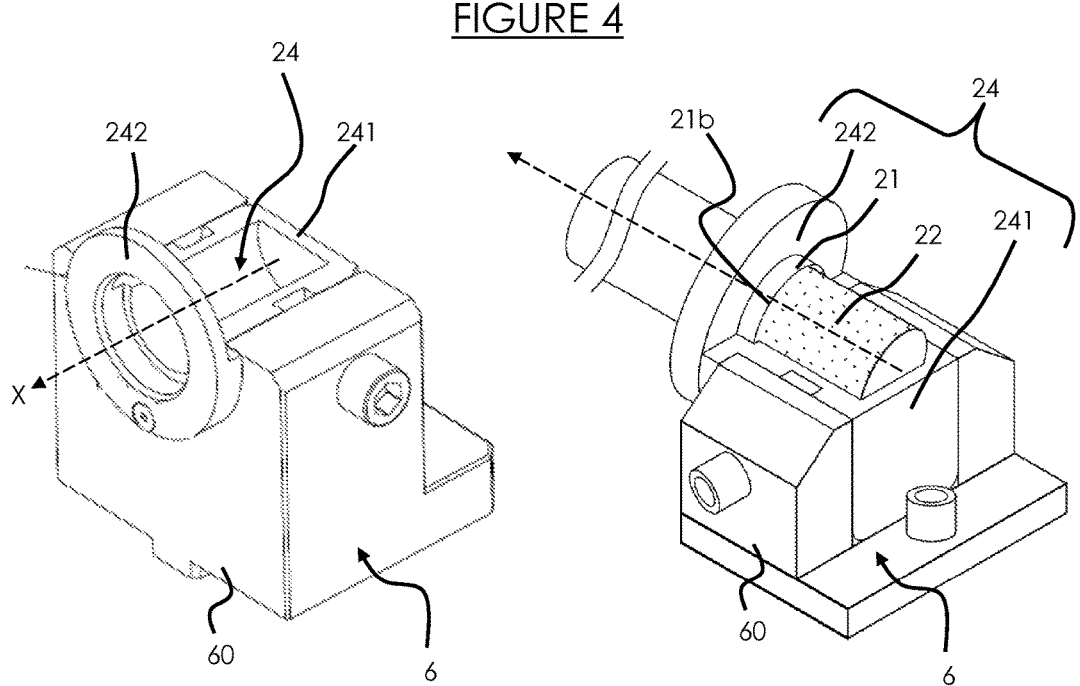
FIG. 5 is a diagrammatic view of a rear bracing member of the bracing module.
FIG. 6 is another diagrammatic view of the rear bracing member in which a pipe is mounted.

In reference to FIGS. 4 to 6, the rear spacing part 24 is mounted at the rear end 21b of the outer duct 21 and cooperates, on the one hand, with the outer surface of the outer duct 21, and the other hand, with the outer surface of the inner duct 22. In practice, the rear spacing part 24 has a first front die cavity 242 corresponding to the diameter of the outer duct 21 and a second rear die cavity 241 corresponding to the diameter of the inner duct 22. Thus, owing to the rear bracing member 6, the bracing module 3 maintains a predetermined functional clearance J at the rear end 21b of the outer duct 21. The rear bracing member 6 includes a structural body 60 including a cavity to receive and brace the rear spacing part 24.

In reference more particularly to FIGS. 5 and 6, the rear bracing member 6 is U-shaped, the cavity of the U facing vertically upward. The first front die cavity 242 of the rear spacing part 24 has an annular shape to receive the outer duct 21 and guide it, while the second rear die cavity 241 of the rear spacing part 24 assumes the form of an axial half-cylinder to correspond to the diameter of the inner duct 22. Due to the different diameters between the die cavities 241, 242, any backward movement of the outer duct 21 is prohibited by the rear spacing part 24. Furthermore, the second rear die cavity 241 includes a rear stop surface to block any backward movement of the inner duct 21. The rear end of the longitudinal pipe 2 is positioned perfectly, given that any movement of the ducts 21, 22 is prevented.

In other words, owing to the bracing members 5, 6, the bracing module 3 braces the pipe 2 along the axis X in order to keep the ducts 21, 22 substantially coaxial relative to one another.

Preferably, in reference to FIGS. 2 and 3, the bracing module 3 includes a plurality of elementary supports 31 distributed longitudinally below the outer duct 21 to prevent buckling of the pipe 2 during bracing at its ends.

In reference to FIG. 7, the insertion module 4 comprises a pusher member 7, guided longitudinally along the axis X, that is configured to move a spacer between the inner longitudinal duct 22 and the outer longitudinal duct 21 of the pipe 2, i.e., determined by the functional clearance J. In reference to FIG. 8, the pusher member 7 assumes the form of a longitudinal pin gauge with an annular section and the inner diameter of which is larger than the outer diameter of the inner duct 22 and the outer diameter of which is smaller than the inner diameter of the outer duct 21, the pusher member 7 comprising a front end 7a and a rear end 7b. Preferably, the diameter of the pusher member 7 is equal to 4 mm so as, on the one hand, to be rigid enough, and on the other hand, to limit the friction with the outer duct 21. Also preferably, the length of the pusher member 7 is comprised between 1.5 m and 3 m.

Preferably, the pusher member 7 is made from carbon so as to have greater rigidity in order to remain longitudinally aligned when it is inserted while only being maintained by one of its ends.

The pusher member 7 includes a driving part 70 that assumes, in this example, the form of a tongue mounted at the front end 7a of the pusher member 7. In reference to FIG. 7, the insertion module 4 further comprises a plurality of guide members 8, distributed longitudinally, in order to track the movement of the pusher member 7 along the axis X.

As illustrated in FIG. 9, each guide member 8 includes a structural platen 80, fixed to the support table 103, that comprises a through orifice 81 extending along the axis X and the inner diameter of which is suitable for cooperating with the outer diameter of the pusher member 7 in order to allow it to be guided as shown in FIG. 8. In reference to FIG. 9, each guide member 8 further includes a circulation slot 82, extending parallel to the axis X, placing the through orifice 81 in communication with an edge of the structural body 80 of the guide member 8. As will be described below, the circulation slot 82 makes it possible to allow the circulation of the driving part 70 during the longitudinal guiding of the front part 7a of the pusher member 7.

In reference to FIG. 7, the insertion module 4 further comprises driving means 9 for the pusher member 7. In this example, in reference to FIGS. 7 and 10, the driving means 9 include a driving wheel 91 connected to the driving part 70 of the pusher member 7 by a belt 92. Thus, depending on the rotation direction of the driving wheel 91, the operator P can command a forward or backward movement of the pusher member 7. Of course, the driving means 9 may be other appropriate means, for example, a pinion and rack system. Of course, the driving means 9 may also be motorized.

In reference to FIG. 7, the insertion module 4 further comprises stop means configured to block the movement of the pusher member 7 in order to precisely define the longitudinal position of the spacer in the pipe 2, i.e., the longitudinal distance relative to the front end 21a of the outer duct 21 in the bracing module 4.

In this example, the stop means assume the form of a stop member 41 mounted in the movement axis of the driving part 70 of the pusher member 7 in order to prevent any backward movement past the position of the stop member 41. Preferably, the stop member 41 is mounted movably in said support table 103 so as to be able to modify the longitudinal insertion position of the spacer in the pipe 2.

We will now describe one embodiment of a method for positioning a spacer in a pipe 2. In reference to FIG. 11, the spacer 1 assumes the form of a flexible wall made from a damping material of the polymer type (polytetrafluoroethylene (PTFE)) designed to be wound around the outer surface of the inner duct 22. The axial length of the spacer 1 is chosen by the operator P based on instructions necessary for sintering operations that must be performed later on the pipe 2.

In reference to FIG. 2, the method for positioning a spacer 1 in a pipe 2 includes a step for bracing a pipe 2 of the storage module 101 in the bracing module 3. During the bracing step, the ends of the pipe 2 are respectively mounted in the front bracing member 5 and the rear bracing member 6 so that the pipe 2 is perfectly braced in the bracing module 3, whose position is defined precisely relative to the insertion module 4. In the bracing position, the inner duct 22 protrudes from the front end 21a of the outer duct 21. Owing to the rear separating part 24, the ducts 21, 22 are coaxial.

Advantageously, in reference to FIG. 2, the storage module 101 and the bracing module 3 are adjacent on the positioning system 100, which limits any unpleasantness for the operator P.

Still in reference to FIG. 2, the method further includes a step for cutting of a spacer 1 to the desired dimensions by an operator on the cutting module 102 of the positioning system 100. In practice, the operator P uses a guillotine to cut a spacer wall 1. Of course, the spacer 1 could be cut prior to the bracing step of the pipe 2 in the bracing modules 5, 6.

Figure 11:
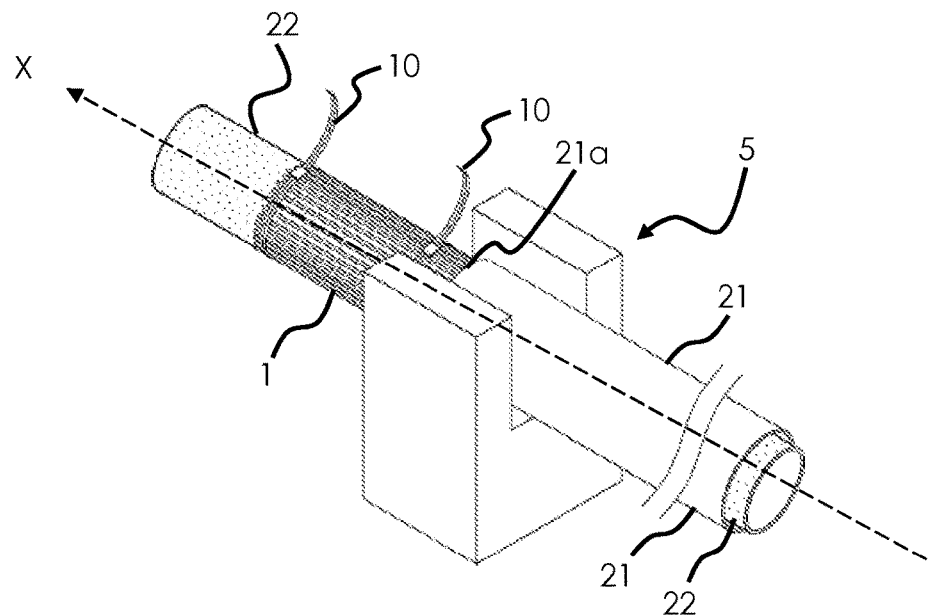
FIG. 11 is a perspective view of a step for assembling a spacer around the inner duct of the pipe mounted in the bracing module.

As illustrated in FIG. 11, the method further includes a step for mounting the spacer 1 around the portion of the inner duct 22 protruding from the front end 21a of the outer duct 21. To that end, the spacer 1 is found at the periphery of the inner duct 22 in order to have a constant thickness. Then, the spacer 1 is maintained by fastening means, preferably removable, around the inner duct 22. In this example embodiment, the spacer 1 is maintained by removable connections 10, preferably, collars made from a plastic material that can be used during the assembly of the spacer, then removed over the course of the insertion of the spacer 1 so as to be reused later. Preferably, removable connections 10 like those known under the commercial name Colson® or Rilsan® may be used.

The method includes a step for adjusting the position of the stop member 41 on the table 103 in order to determine the longitudinal position of the spacer 1 in the pipe 2 relative to the front end 21a of the outer duct 21, i.e., relative to the front bracing member 5 whose axial position is preferably stationary relative to the table 103.

Figure 12:
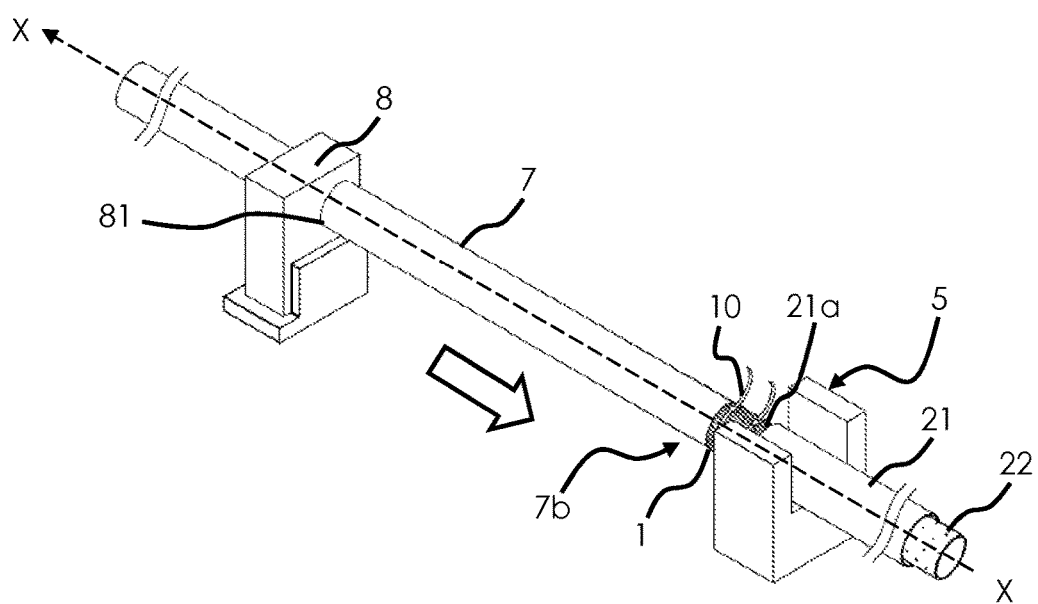
FIG. 12 is a perspective view of a step for inserting the spacer between the inner duct and the outer duct of the pipe.

In reference to FIG. 12, the method next includes a step for driving the pusher member 7 backward along the axis X so that it moves the spacer 1 in the pipe 2. In this example, the operator P actuates the driving wheel 91 to move the belt 92 and thus drive the driving part 70 of the pusher member 7 backward.

During the driving, the pusher member 7 is guided along the axis X in the orifices 81 of the guide members 8. The driving part 70 of the pusher member 7 moves in a circulation slot 82 of each guide member 8 and is thus not stopped by the guide members 8.

During the driving, the rear end 7b of the pusher member 7 comes into contact with the spacer 1 and moves it gradually and in a controlled manner in the functional clearance J, i.e., between the inner duct 22 and the outer duct 21 at the front bracing member 5. The pusher member 7 comes into contact with the entire front annular edge of the spacer 1, which guarantees regular movement. Although the pusher member 7 is only maintained at its front end during the insertion, it remains aligned along the axis X due to the rigidity of its carbon body.

When the driving part 70 of the pusher member 7 comes into contact with the stop member 41, the spacer 1 is situated in the desired longitudinal position in the pipe 2. The pusher member 7 is then moved in the opposite direction to remove it from the pipe 2. The pipe 2, in which the spacer 1 is positioned, can be removed from the bracing module 3 in order to undergo a sintering step, the spacer 1 damping the mechanical sintering stresses to protect the ducts 21, 22.

Advantageously, when the spacer 1 is only partially inserted into the pipe 2, the removable sections 10 can be removed given that the outer duct 21 ensures maintenance of the spacer 1 around the periphery of the inner duct 22. Alternatively, during the insertion of the spacer 1 into the pipe 2, the removable connections 10 maintaining the spacer 1 come into contact with the outer duct 21 and translate on the spacer 1 until extending over the pusher member 7. In other words, the removable connections 10 are not inserted into the pipe 2.

Preferably, several spacers are successively inserted into a same pipe 2 in different longitudinal positions in order to form a pipe 2 including several sintered portions.

Owing to the invention, several spacers 1 can be placed quickly and reproducibly in a pipe 2, which saves time and thus limits the overall cost of the operations prior to the sintering. Furthermore, since the positioning of the spacers 1 is precise, the sintering is done optimally.

The invention claimed is:

1. A system for positioning at least one spacer in a longitudinal pipe having an outer duct and an inner duct mounted in said outer duct, the system including:
   a bracing module configured to maintain a pipe longitudinally along an axis X while maintaining positioning clearance between the inner duct and the outer duct for creating an inner-space between the inner duct and the outer duct;
   an insertion module having a pusher member with a pushing end, guided longitudinally along said axis, that is sized and shaped to move at least one spacer in the inner-space between the inner duct and the outer duct from a first position in the inner-space to a second position in the inner-space;
   wherein the outer duct has a front end and a rear end, the bracing module includes a front bracing member and a rear bracing member each with a body that are suitable for cooperating with the front end and the rear end of the outer duct, respectively; and
   wherein the rear bracing member comprises a first die cavity with an inside diameter for receiving the outer duct and a second die cavity having an open structure with a radius for receiving the inner duct but not the outer duct.

2. The system according to claim 1, wherein said pusher member has an annular section for receiving the inner duct.

3. The system according to claim 1, wherein the insertion module includes a plurality of guide members distributed longitudinally along the axis X to guide the pusher member.

4. The system according to claim 1, wherein the insertion module includes means for driving the pusher member.

5. The system according to claim 1, wherein the insertion module includes stop means configured to limit the movement of the pusher member.

6. The system according to claim 1, wherein the second die cavity has a U-shape facing vertically upward, away from a ground surface.

7. The system according to claim 1, wherein the inner duct has a front end and a rear end, said front end of said inner duct extending externally beyond the front end of the outer duct and said rear end of said inner duct extending externally beyond the rear end of the outer duct, and wherein the rear bracing member of the bracing module limits movement of the rear end of the outer duct and the rear end of the inner duct along the axis X.

8. A system for positioning at least one spacer in a longitudinal pipe having an outer duct and an inner duct mounted in said outer duct, the system including:
   a bracing module configured to maintain a pipe longitudinally along an axis X while maintaining positioning clearance between the inner duct and the outer duct for creating an inner-space between the inner duct and the outer duct;
   an insertion module having a pusher member with a pushing end, guided longitudinally along said axis, that is sized and shaped to move at least one spacer in the inner-space between the inner duct and the outer duct from a first position in the inner-space to a second position in the inner-space;
   wherein the insertion module comprises a driving part with a front end having driving part outside diameter and a driving part inside diameter and said bracing module comprises a front bracing member and a rear bracing member, wherein said front bracing member comprises a stop part having an inside diameter sized and shaped to accommodate an outer duct and said rear spacing member comprises a front die cavity and a rear die cavity and wherein the front and rear die cavities having different diameters.

9. The system according to claim 8, wherein the front bracing member is fixed along the axis X and the rear bracing member is movable along the axis X to accommodate a length of a longitudinal pipe.

10. The system according to claim 8, further comprising a cutting module, said cutting module being structured for cutting a spacer, said spacer being sized and shaped to locate in an inner-space of a pipe having an outer duct and an inner duct.

11. The system according to claim 8, wherein the rear die cavity has a smaller diameter than the front die cavity.

12. The system according to claim 4, wherein the means for driving the pusher member comprises a driving wheel connected to a driving part by a belt, a motorized component, or a pinion and rack system.

13. The system according to claim 7, wherein a first spacer made from a polymer material is located in the inner-space between the outer duct and the inner duct at a first position inside the inner-space and a second spacer made from a polymer material is located in the inner-space at a second position inside the inner-space.

14. A system for positioning at least one spacer in a longitudinal pipe having an outer duct and an inner duct mounted in said outer duct, the system including:
   a bracing module configured to maintain a pipe longitudinally along an axis X while maintaining positioning clearance between the inner duct and the outer duct for creating an inner-space between the inner duct and the outer duct;
   an insertion module having a pusher member with a pushing end, guided longitudinally along said axis, that is sized and shaped to move at least one spacer in the inner-space between the inner duct and the outer duct from a first position in the inner-space to a second position in the inner-space; and wherein the pushing end of the insertion module is located in the inner-space and in contact with the at least one spacer.

15. The system according to claim 14, wherein the bracing module comprises a front bracing member fixed along the axis X and a rear bracing member movable along the axis X to accommodate a length of a longitudinal pipe.

16. The system according to claim 14, further comprising a cutting module, said cutting module being structured for cutting a spacer, said spacer being sized and shaped to locate in an inner-space of a pipe having an outer duct and an inner duct.

17. The system according to claim 14, wherein the bracing module has a rear bracing member comprising a front die cavity and a rear die cavity and wherein the rear die cavity has a smaller diameter than the front die cavity.

18. The system according to claim 14, wherein a first spacer made from a polymer material is located in an inner-space between an outer duct and an inner duct at a first position inside the inner-space and a second spacer made from a polymer material is located in the inner-space at a second position inside the inner-space.

* * * * *